United States Patent [19]

Pampalone

[11] 4,389,433
[45] Jun. 21, 1983

[54] SULFUR DIOXIDE CURED COATINGS

[75] Inventor: Thomas R. Pampalone, Belle Mead, N.J.

[73] Assignee: RCA Corporation, New York, N.Y.

[21] Appl. No.: 261,017

[22] Filed: May 6, 1981

Related U.S. Application Data

[63] Continuation-in-part of Ser. No. 212,810, Dec. 4, 1980, abandoned.

[51] Int. Cl.³ .......................... B05D 3/04; B05D 3/10
[52] U.S. Cl. .................................. 427/341; 427/54.1; 427/342; 427/379; 427/382; 525/344
[58] Field of Search ................ 525/344; 427/341, 342, 427/348, 400

[56] References Cited

U.S. PATENT DOCUMENTS 4,020,256 4/1977 Zweigle ................. 526/88
4,098,977 7/1978 Zweigle ................. 526/77
4,107,156 8/1978 Sunamori ............... 526/91

Primary Examiner—C. A. Henderson
Attorney, Agent, or Firm—Birgit E. Morris; R. Hain Swope

[57] ABSTRACT

An improved method of curing compositions of a monomer containing one or more acrylate moieties coated on a substrate is provided wherein the monomer composition is exposed to sulfur dioxide gas in the presence of a free radical initiator having a hydroperoxide moiety.

14 Claims, No Drawings

SULFUR DIOXIDE CURED COATINGS

CROSS-REFERENCE TO RELATED APPLICATION

This application is a continuation-in-part of copending U.S. patent application Ser. No. 212,810, filed Dec. 4, 1980, now abandoned.

This invention relates to an improved method of curing acrylate and methacrylate compositions coated on a substrate to form films. More particularly, this invention is directed to a method of rapidly and efficiently curing such compositions with gaseous sulfur dioxide.

BACKGROUND OF THE INVENTION

Films comprised of polymers of reactive acrylate and methacrylate monomers are well known and possess many diverse uses. Such films may for example, be utilized by the coating industry for protective and/or decorative coatings on a variety of substrates such as, for example, paper, metal and wood.

Coatings of acrylate and methacrylate polymers, until recently, were prepared by coating a substrate with a solution of the polymer composition in a suitable organic solvent and baking in a furnace to drive the solvent from the resulting film. Due to the stringent requirements concerning water and air pollution and a growing concern to conserve energy, the coating industry has turned to newer methods of forming such films.

Today, coatings of acrylate and methacrylate polymers are often prepared by radiation curing of a monomer or oligomer composition utilizing ultraviolet light. Since radiation curing can be carried out in the absence of conventionally used solvents and does not require a post heating step, it is attractive from the viewpoint of environment protection and energy conservation. Radiation curing of acrylate and methacrylate films has been the subject of considerable research and many scientific articles; for example, Rybny et al, *Journal of Paint Technology*, Vol. 46, No. 596, pp 60–69 (1974).

Radiation curing of monomers, such as acrylates and methacrylates, although attractive from the viewpoint of environmental safety and economy, is not without disadvantages. For example, in radiation curing, the degree of polymerization is directly related to the depth to which the light penetrates the monomer composition. Therefore, complete polymerization is only possible when utilizing relatively thin coatings of monomer composition on the substrate. Thicker films will polymerize to a considerably lesser degree at the base of the films resulting in a loss of adhesion to the substrate.

Another related disadvantage of radiation curing is that the monomer composition must be relatively free of substances which would make it opaque. Therefore, certain substances, otherwise desirable for monomer compositions for a particular utility, cannot be utilized with radiation curing as their presence would retard light penetration, resulting in incomplete polymerization.

As an alternative to radiation curing, monomer compositions, such as acrylates and methacrylates, may be cured by exposure to electron beam.

Electron beam curing, regardless of the type of particle accelerator source to be utilized, requires a very substantial investment in apparatus. Although electron beam curing is effective with coatings which are nonconductive or which contain pigments, its effectiveness is due to the very large voltage of the beam itself. The large amount of energy required to generate a beam of such voltage is a significant disadvantage in today's economic environment. These disadvantages can be particularly significant for certain conventional applications of such films; e.g., the production of wood siding or coating of metal wire.

This invention provides a method of curing acrylate monomer compositions which is not characterized by any of the above-mentioned disadvantages. Such compositions are cured in accordance with this invention by minimal exposure to gaseous sulfur dioxide.

SUMMARY OF THE INVENTION

In accordance with this invention, there is provided a method for rapidly curing acrylate monomer compositions to form films comprising contacting such compositions coated on a suitable substrate with gaseous sulfur dioxide in the presence of a hydroperoxide initiator.

DETAILED DESCRIPTION OF THE INVENTION

The monomers which are caused to polymerize according to this invention are liquid monomers containing one or more acrylate moieties. As utilized in this invention, the term "acrylate moiety" means the moiety represented by the formula:

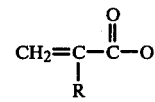

wherein R is hydrogen or methyl.

Representative examples of suitable liquid monomers cured in accordance with this invention include acrylic acid, methacrylic acid, acrylates or methacrylates containing one or more acrylate moieties, such as alkyl acrylates, alkyl methacrylates, hexamethylenediol diacrylate or dimethacrylate, trimethylolpropane triacrylate or trimethacrylate, polypropylene glycol tetraacrylate or tetramethacrylate, allyl acrylate or methacrylate, and the like. Acrylate and methacrylate monomers which are suitable for the process of this invention, are those recognized as being polymerizable in systems utilizing so-termed "redox" free radicals. Preferred monomers in accordance with this invention are multifunctional acrylates or methacrylates, i.e. those monomers containing more than one acrylate moiety. Generally, acrylates are preferred over methacrylates for most applications since they cure more rapidly.

It is significant that sulfur dioxide cures, i.e., polymerizes, coatings of the above-named monomers on a suitable substrate without itself becoming part of the resulting polymer. Such would not be expected in view of the significant number of teachings of the use of sulfur dioxide to cure monomer compositions, e.g., rubber polymers, wherein the sulfur dioxide becomes part of the resulting polymer. It is to be noted, however, that when there is unsaturation in the alcohol portion of an acrylate or methacrylate monomer, e.g., allyl acrylate, polymerization according to this invention will yield a polymer containing some sulfur dioxide. It has been shown that, for such monomers, sulfur dioxide addition takes place only at the double bond or bonds in the alcohol portion of the ester, and there is no addition in the acrylate configuration. The exact mechanism, whereby sulfur dioxide functions only as a curing agent in the process of this invention, is not known. The addition of sulfur dioxide to olefins is, of course, known to those skilled in the art.

In accordance with this invention, monomers containing one or more acrylate moieties are rapidly and efficiently caused to polymerize by exposure to sulfur dioxide gas. The resultant polymers, except as noted above in the instance of an ester containing an unsaturated alcohol moiety, contain no sulfur dioxide and are, for all practical purposes, substantially the same as polymers conventionally produced from the same monomers by other curing procedures. The polymerization process of this invention is highly advantageous in comparison with conventional methodology in terms of the amount of energy required, cost of equipment required, potential impact on the environment, and most important, its speed. Complete curing of coatings of the monomers named herein can be effected by the process of this invention within a minute and usually within a few seconds. The high speed cure provided by this invention may also be utilized to effect a partial cure of the monomer composition for certain applications as will be discussed hereafter.

The curing process of this invention is further advantageous in that, in contrast to conventional radiation curing methodology, it is effective to a much greater depth of coating with coatings containing opaque materials. Because the method of this invention is carried out utilizing a gas, it is unaffected by variations in the surface of the substrate coated with the monomer composition.

In accordance with the present invention, the monomer composition to be cured with sulfur dioxide gas must contain a free radical initiator. Free radical initiators suitable for use in the process of this invention include hydrogen peroxide or organic hydroperoxides, i.e., compounds containing one or more —OOH moieties. Examples of specific organic hydroperoxides suitable for use in the process of this invention include t-butylhydroperoxide, cumene hydroperoxide, 2,4-dimethyl-2,4-hexanedihydroperoxide and the like. Particularly preferred for this invention is t-butylhydroperoxide. It is to be noted that organic peroxides, i.e., compounds having the formula R—O—O—R' wherein both R and R' are organic radicals, are completely ineffective in the curing method of this invention.

The amount of the hydroperoxide free radical initiator present in the monomer compositions cured in accordance with this invention may vary within a wide range. Generally, however, it is contemplated that the free radical initiator be present in from about 0.001 part to about 0.2 part per part of the monomer content on a weight basis. Preferably, the monomer composition contains from about 0.01 to about 0.06 part free radical initiator per part of monomer on a weight basis.

The monomer compositions cured in accordance with the present invention may contain various additives such as are conventionally recognized in the art. Such additives would include pigments, fillers, binders and the like. The addition of a binder is preferred because it permits adjustment of the viscosity of the monomer composition and adds flexibility and resiliency to films produced therefrom. Binders utilized in accordance with this invention are dissolved in the monomer and must be soluble therein. Preferred binders include, for example, linear acrylate polymers, i.e., polymerized monofunctional acrylates or copolymers containing them. A particularly preferred binder is a polymethylmethacrylate copolymer marked by E. I. duPont de Nemours and Co. under the trademark Elvacite 2013. Generally, wherein a binder is present in the compositions cured in accordance with this invention, it will constitute from about 10 percent by weight to about 40 percent by weight, preferably from about 20 percent by weight to about 30 percent by weight of the composition, depending on the solubility thereof in the monomer.

The monomer compositions also preferably contain conventional chain transfer agents such as, for example, Michler's ketone or certain amines such as triethylamine, which facilitate the speed and degree of polymerization. The presence and amount of the above named additives would, of course, be predicated on conventional practices concerning the end use for the film. As noted above, it is a distinct advantage of the method of this invention that a cure is effected even in the presence of additives which would make the monomer composition opaque to the penetration of light.

The films produced in accordance with this invention are useful in both protective and decorative coatings for a wide variety of substrates, as is the case with films produced by conventional curing procedures. The films produced by the novel curing method of this invention are comparable by physical characteristics to films prepared from the same monomers by conventional techniques, such as ultraviolet light or electron beam curing.

The process of this invention comprises forming a solution of the free radical initiator and the binder, if one is present, in the monomer, coating the solution onto a suitable substrate to a predetermined thickness and exposing the coating to sulfur dioxide gas for a period of time sufficient to effect the desired cure of the coating. The resultant film may remain as a coating on the substrate or may be removed therefrom and otherwise used, depending on conventional practices.

Since a solution of the free radical initiators and binders in most of the monomers contemplated herein is readily effected, the inclusion of a solvent in the monomer composition is generally not required. As stated above, the monomer composition may contain conventional additives in their usual amounts.

The thickness of the coating of the monomer composition on the substrate is also variable depending on the intended use of the resultant film. As a general matter, coatings from about 0.1 to about 10 mils thick are contemplated. As noted above, the method of this invention is advantageous in that it readily cures coatings which are not rapidly cured by conventional curing procedures, such as ultraviolet light, due to their opacity.

The monomer composition is applied to the substrate by any conventional method, e.g., spraying, spinning, painting, and the like. The coating may be applied in a single application or a series of applications, as necessary to achieve the desired thickness.

Exposure of the monomer coating to sulfur dioxide is carried out generally under ambient conditions, for example, by passing coated substrates through a reservoir of gaseous sulfur dioxide or simply spraying the coating with gaseous sulfur dioxide. It is not necessary to exclude air from the treatment system since the presence of oxygen does not impair the curing process unless the level of sulfur dioxide in the curing atmosphere falls to a significantly low level, i.e., about 10 percent or less. Often the film will warm somewhat during the curing process. Therefore, external heating is not required.

Exposure time for the process of this invention is generally well under one minute. Curing is complete in most instances in 30 seconds or less and often in 2 to 5 seconds. To assure a complete cure, therefore, the coating is exposed to sulfur dioxide gas for approximately 2 to 30 seconds, preferably for approximately 5 to 10 seconds. The exposure time required to effect curing of a particular monomer composition is not affected by the presence of the usual quantities of conventional additives in said composition.

The exposure time and coating thickness according to this invention may be adjusted to give a partial cure only at the surface of the coating. For example, films having a non-gloss or reticulated surface may be produced in accordance with this invention by effecting a partial cure of the monomer composition with sulfur dioxide followed by complete curing with ultraviolet light. Such reticulated films are useful for decorative or practical, e.g., non-skid, applications.

In order to produce a reticulated film, curing must be as rapid as possible since the rapid surface cure acts to prevent sulfur dioxide gas from penetrating to the substrate. Therefore, acrylic acid and esters containing one or more acrylate moieties are preferred monomers over the corresponding methacrylates for this application as they are known to polymerize at a faster rate. Further, it is particularly preferred when preparing reticulated films in accordance with this invention that the monomer composition contain a conventional chain transfer agent to make the cure as rapid as possible. Such agents, preferably triethylamine, are present in the monomer composition in from about 1 percent by weight to about 10 percent by weight, preferably from about 2 percent by weight to about 5 percent by weight. It has been found in accordance with this invention that a reticulated film can be produced from a coating as thin as one mil. Surface curing of acrylate coatings containing a chain transfer agent can be effected in accordance with this invention by spraying the surface with sulfur dioxide gas for one or two seconds.

The curing of the reticulated film is then completed by conventional ultraviolet irradiation, generally for from one to three minutes, depending on the thickness of the coating. It is also possible to pattern the reticulated surface of the film by exposing portions thereof through a suitable mask or other conventional means to ultraviolet light thereby curing those portions of the film to the substrate. The remaining portions of the film are then reticulated as described herein, i.e., by exposure to sulfur dioxide gas for one to two seconds followed by complete curing with ultraviolet light.

In order for a film having a reticulated surface to be produced, the monomer compositions must contain a conventional UV sensitizer. Suitable sensitizers include, for example, 2,2-diethoxyacetophenone, benzoin methyl ether, benzoin ethyl ether, benzophenone and the like with 2,2-diethoxyacetophenone being preferred. The UV sensitizer would be present in from about 2 percent by weight to about 10 percent by weight, preferably about 5 percent by weight, depending on the coating. To be useful in the method of this invention, a UV sensitizer must be sufficiently soluble in the liquid monomers to be effective in achieving a complete cure of the film after surface polymerization.

Films totally cured by the method of this invention have been found to be completely cured down to the substrate, to adhere well to various substrates where adherence is desired, and to be comparable to films produced by conventional curing procedures in all other respects.

The invention will be further illustrated in the following examples which are not intended in any way to be limiting thereon. In the examples, parts and percentages are by weight.

EXAMPLES 1–10

Ten monomers were polymerized according to the following procedure. Solutions of ten parts of the respective monomer and 0.2 part of t-butylhydroperoxide were coated on 2"×2" glass slides to a thickness of approximately 5 mils. The coatings were sprayed with sulfur dioxide gas at ambient temperature whereupon the coatings warmed and completely hardened. Each film was scraped from the slide, vacuum dried for about 20 hours, and analyzed for carbon, hydrogen and sulfur content by combustion analysis. The monomers, curing time and analysis are given in the following table.

Infrared analysis of the sulfur dioxide cured films of glacial acrylic acid and glacial methacrylic acid could not be distinguished from spectra for authenticated samples of polyacrylic acid and polymethacrylic acid, thus further indicating that no sulfur dioxide was taken up by the monomer in the polymerization process. Polymerization of acrylonitrile and allylglycidyl ether was carried out to demonstrate that absorption of sulfur dioxide into the polymer will take place at a site other than an acrylate moiety. In the case of allyl acrylate (Example 3) some sulfur dioxide addition occurs at the olefinic double bond. Omission of t-butylhydroperoxide from the monomer solution produced no curing upon treatment with sulfur dioxide.

TABLE

| EXAMPLE NO. | MONOMER | CURING TIME (SECONDS) | ANALYSIS % C | % H | % S |
|---|---|---|---|---|---|
| 1 | Acrylonitrile | 30 | 52.31 | 5.83 | 6.54 |
| 2 | Allylglycidyl ether | 5 | 51.66 | 7.71 | 3.24 |
| 3 | Allyl acrylate | 2 | 62.45 | 7.09 | 2.74 |
| 4 | Pentaerythritol triacrylate | 5 | 55.95 | 5.88 | 0.00 |
| 5 | Polypropylene glycol tetraacrylate | 5 | 57.81 | 7.78 | 0.00 |
| 6 | Hexamethylenediol diacrylate | 5 | 62.48 | 8.11 | 0.00 |
| 7 | Glacial acrylic acid | 2 | 48.89 | 5.87 | 0.00 |
| 8 | Glacial methacrylic acid | 20 | 52.79 | 6.82 | 0.00 |
| 9 | Trimethylolpropane triacrylate | 5 | 59.57 | 7.01 | 0.00 |
| 10 | Trimethylolpropane trimethacrylate | 20 | 62.27 | 7.66 | 0.00 |

EXAMPLE 11

A pigmented film was prepared by coating a 2"×2" glass slide with a coating approximately 10 mils thick of a slurry of 0.5 part activated charcoal in two parts of the allyl acrylate solution according to Example 3. The coating was cured with sulfur dioxide gas at ambient temperature for two seconds. A totally hardened film was produced, indicating that the presence of pigments in the monomer composition had no effect on the polymerization with sulfur dioxide.

Slurries of activated charcoal in trimethylolpropane triacrylate (Example 9) and trimethylolpropane trimethacrylate (Example 10) were treated in a similar manner. Cured films were produced to a maximum depth of 5 mils. Above 5 mils in thickness, the coating remained tacky.

EXAMPLE 12

The procedure of Example 11 was repeated utilizing a coating approximately 5 mils thick of a slurry of 0.5 part activated charcoal in two parts of the allyl acrylate solution of Example 2. Spraying with sulfur dioxide gas for five seconds produced a comparable film.

EXAMPLE 13

A pigmented film containing a binder was prepared as follows. One part of Elvacite 2013 (PMMA copolymer) available from E. I. duPont was dissolved in five parts of the allyl acrylate solution of Example 3 and 0.5 part of activated charcoal was slurried into the resulting solution. The slurry was coated on a 2"×2" glass slide to a thickness of approximately 10 mils. A two-second cure with sulfur dioxide produced a totally hardened film which adhered well to the glass substrate, demonstrating that the presence of pigments and a binder had no effect on the polymerization with sulfur dioxide.

EXAMPLE 14

0.2 gram quantities of benzoyl peroxide, dicumenyl peroxide, di-t-butylperoxide and lauroyl peroxide were each dissolved in 10 ml of trimethylolpropane trimethacrylate. The individual solutions were coated on 2"×2" glass slides. The slides were sprayed with sulfur dioxide gas for two minutes. No polymerization was observed. The addition of a few drops of t-butylhydroperoxide to each slide produced spontaneous polymerization in each instance.

EXAMPLE 15

0.5 ml of 30 percent hydrogen peroxide was shaken with 10 ml of trimethylolpropane trimethacrylate and the resulting solution coated on a 2"×2" glass slide. Exposure to sulfur dioxide gas produced polymerization, but at a rate slower than that observed with t-butylhydroperoxide.

One percent solutions of 2,4-dimethyl-2,4-hexanedihydroperoxide in trimethylolpropane trimethacrylate were coated on 2"×2" glass slides. Exposure to sulfur dioxide gas produced polymerization in each instance at a rate comparable to t-butylhydroperoxide.

EXAMPLE 16

In order to demonstrate the effect of conventional chain transfer agents on the polymerization of the monomers of this invention, a slurry of 0.1 ml t-butylhydroperoxide, 5 ml trimethylolpropane trimethacrylate, 0.5 g activated charcoal and 0.1 g Michler's ketone (4,4'-bis-N,N-dimethylaminobenzophenone) were coated on glass slides according to the procedure of Example 11 and exposed to sulfur dioxide gas. Experiments with coatings of various thicknesses demonstrated that the presence of Michler's ketone increased both the speed of polymerization and the hardness of the resulting film. The depth of polymerization was approximately twice that in a comparable experiment without Michler's ketone, Example 11. A comparable slurry containing no t-butylhydroperoxide showed no polymerization on exposure to sulfur dioxide gas.

EXAMPLE 17

Ten parts of a 20 percent by weight solution of Elvacite 2013 in trimethylolpropane trimethacrylate was mixed with 0.5 part t-butylhydroperoxide and the resulting solution coated to various thicknesses on a glass plate. The coatings were sprayed with sulfur dioxide gas for 5 seconds. Curing was slow and no surface reticulation was observed for coatings having thicknesses of from 1 to 20 mils. A second solution additionally containing 0.5 part of triethylamine was coated on glass plates and sprayed as before. Reticulation was observed on coatings from 5 to 20 mils thick, but not on coatings less than 5 mils thick.

EXAMPLE 18

Solutions were prepared which were identical to those of Example 17 with the exception of replacing trimethylolpropane trimethacrylate with trimethylolpropane triacrylate. The solution containing no triethylamine showed reticulation in thicknesses of from 5 to 20 mils and no reticulation for thicknesses less than 5 mils. The solution containing triethylamine demonstrated reticulation in coatings as thin as 1 mil. In all instances, curing was appreciably faster than with the solutions of Example 17.

A second solution of trimethylolpropane triacrylate, Elvacite 2013, t-butylhydroperoxide and triethylamine was prepared. To this solution was added 0.5 part 2,2-diethoxyacetophenone and coatings were formed and sprayed with sulfur dioxide gas in a similar manner. The reticulated coatings were irradiated with a medium pressure mercury lamp at 10 milliwatts per second for from one to two minutes, depending on the thickness of the coating. A completely cured, reticulated film was produced in each instance.

EXAMPLE 19

In order to demonstrate the effect of other gases on the polymerization of the monomers of this invention, solutions of t-butylhydroperoxide in trimethylolpropane were coated on glass slides according to the procedure of Example 9. The coated slides were sprayed with carbon monoxide and nitrous oxide, respectively. In each instance, no polymerization was observed after 2 minutes exposure.

The slide exposed to carbon monoxide was then sprayed with sulfur dioxide. Polymerization occurred at a rate comparable to that observed in Example 9.

Spraying of the slide exposed to nitrous oxide with sulfur dioxide produced no polymerization. On the theory that the nitrous oxide had by some mechanism inactivated the t-butylhydroperoxide, additional t-butylhydroperoxide was added to the coating. Further exposure to sulfur dioxide produced spontaneous polymerization.

EXAMPLE 20

In order to demonstrate the effect, if any, of the presence of oxygen on the curing method of this invention, solutions of 0.5 part t-butylhydroperoxide in 10 parts trimethylolpropane trimethacrylate were coated on glass to a thickness of 5 mils. Samples of such coatings were sprayed for 5 seconds with mixtures of sulfur dioxide and air beginning at 100 percent sulfur dioxide and gradually increasing the amount of air mixed therewith. There was no apparent inhibitory effect of air on polymerization rate or depth until the amount of air reached about 90 percent, the limit of detection with the apparatus utilized. At about 90 percent air, the coating cured very slowly and only at the surface.

I claim:

1. A method of forming a film on a substrate consisting essentially of applying to the substrate a nonaqueous composition comprising a solution of a free radical initiator having a hydroperoxide moiety in a liquid monomer containing one or more acrylate moieties and curing said composition by exposing same to sulfur dioxide gas.

2. A method according to claim 1, wherein the composition is exposed to sulfur dioxide gas for from about 1 to about 30 seconds.

3. A method according to claim 1, wherein the composition is exposed to sulfur dioxide gas for from about 2 to about 5 seconds.

4. A method according to claim 1, wherein the composition contains from about 0.001 part to about 0.2 part by weight of the free radical initiator for each part by weight of the monomer.

5. A method according to claim 1, wherein the composition contains from about 0.01 part to about 0.06 part by weight of the free radical initiator for each part by weight of the monomer.

6. A method according to claim 1, wherein the free radical initiator is selected from the group consisting of hydrogen peroxide, t-butylhydroperoxide, cumene hydroperoxide and 2,4-dimethyl-2,4-hexanedihydroperoxide.

7. A method according to claim 6, wherein the free radical initiator is t-butylhydroperoxide.

8. A method according to claim 1, wherein the monomer is selected from the group consisting of acrylic acid, methacrylic acid, acrylates and methacrylates containing one or more acrylate moieties.

9. A method according to claim 8, wherein the monomer is selected from the group consisting of methacrylic acid, hexamethylenediol dimethacrylate, trimethylolpropane trimethacrylate, polypropylene glycol, tetramethacrylate and allyl methacrylate.

10. A method according to claim 9, wherein the monomer is trimethylolpropane trimethacrylate.

11. A method according to claim 1, wherein the monomer is trimethylolpropane triacrylate and the free radical initiator is t-butylhydroperoxide.

12. A method according to claim 1, wherein the monomer is selected from the group consisting of acrylic acid, hexamethylenediol diacrylate, trimethylolpropane triacrylate, polypropylene glycol tetraacrylate and allyl acrylate.

13. A method according to claim 12, wherein the monomer is allyl acrylate.

14. A method according to claim 12, wherein the monomer is trimethylolpropane triacrylate.

* * * * *